D. STANCHFIELD.
Plow.
No. 229,484.        Patented June 29, 1880.
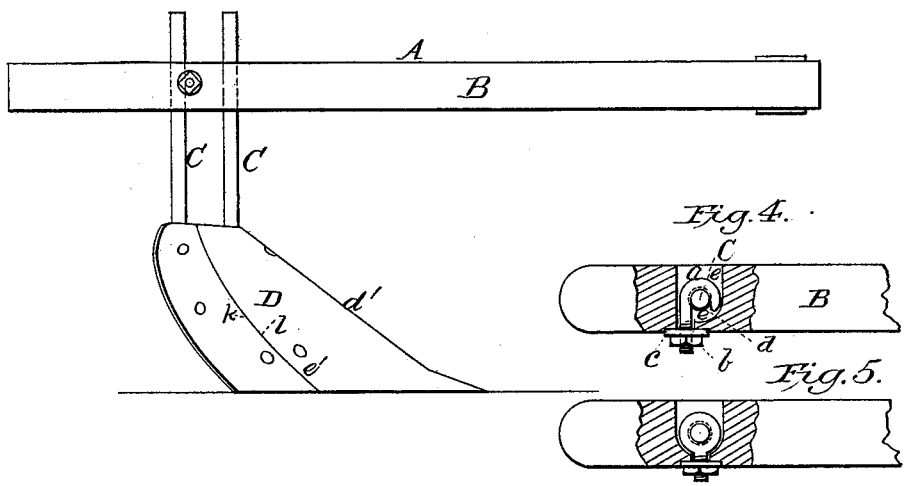
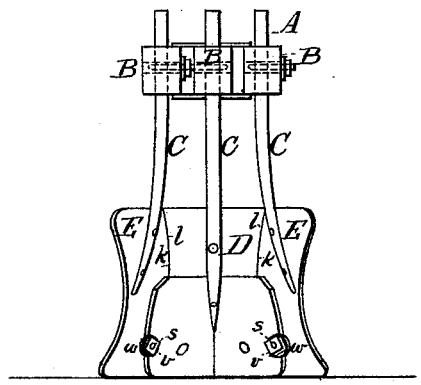
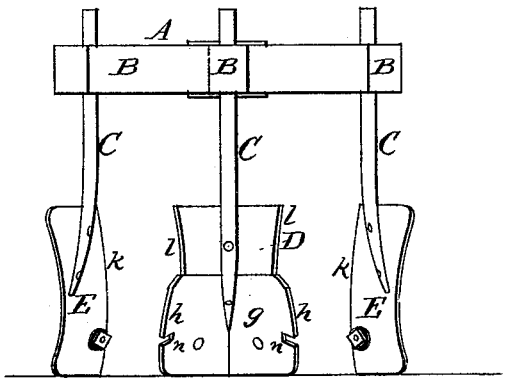
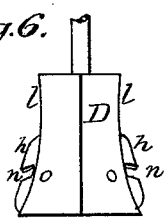
WITNESSES
John A. Ellis
Phil. C. Masi
INVENTOR
D. Stanchfield,
by E. W. Anderson
his ATTORNEY

UNITED STATES PATENT OFFICE.

DANIEL STANCHFIELD, OF DAVENPORT, IOWA.

PLOW.

SPECIFICATION forming part of Letters Patent No. 229,484, dated June 29, 1880.

Application filed November 18, 1879.

*To all whom it may concern:*

Be it known that I, DANIEL STANCHFIELD, of Davenport, in the State of Iowa, have invented a new and valuable Improvement in Plows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of this invention. Fig. 2 is a rear view, showing the plow-sections together. Fig. 3 is a rear view, showing the plow-sections separated. Figs. 4, 5, and 6 are details.

This invention has relation to plows.

The nature of the invention consists in the combination, with the beams adjustable toward or from each other and a plow-section having a shank, of side mold-boards, each provided with an independent shank, said section and mold-boards adapted to be secured together to form a single-wing plow or detached to form cultivator-teeth, as hereinafter shown and described.

In the accompanying drawings, the letter A designates any suitable frame, and B indicates the hinged and expansible beams, to which the shanks of the sections are attached by eyebolts $a$, nuts $b$, and washers $c$ in the following manner: A hole or socket, $d$, for the shank C of each plow-section is bored vertically through the beam B, and a second hole, $e$, is made transversely through the beam, intersecting the shank-hole. This second hole is expanded around the shank-hole in the form of a horizontal recess to receive the eye portion of the eyebolt, its threaded end passing through the smaller aperture on one side and through the washer $c$, which is let into this side to engage with the nut $b$.

The shank C, passing up through the eye of the eyebolt in its passage through the shank-hole, is in position to be drawn tightly against the side of the shank-hole by means of the nut, and thereby secured in a rigid manner.

The object of providing a very firm fastening having an easy turning adjustment is to enable the sectional center and side mold-boards forming the plow to be easily connected together or detached.

D indicates the central section of the plow, having a sloping angular center, $d'$, and wings $e'$, extending downward and laterally in a curved shelving or inclined manner, as indicated in the drawings. The central portion of this plow-section is supported by a re-enforcement or back piece, $g$, having notched projecting edges $h$; or notched flanges may be formed on the plow-section at its sides to project in a similar manner. A strong shank extends upward from this central section, as shown.

E E indicate the side sections or mold-boards, secured to their shanks in such a manner as to have a surface slope and contour similar to that of the wings of the central section. The forward edges $k$ of these side pieces are of similar size and form to the rear edges, $l$, of the wings of the center section, and are designed to fit closely and neatly thereto when drawn up in contact therewith, the rear faces of these side pieces resting against the projecting edges or flanges $h$, the notches $n$ of which receive the threaded pins or bolts $s$ of said side pieces, while suitable washers $w$ and nuts $v$ are employed to secure the connection of the parts, which, in this relation, form a plow.

When it is desired to use the parts as cultivator-teeth the nuts $v$ are loosened and the side mold-boards detached from the center section, the three parts forming separate teeth, each having its own shank for connection with the cultivator-beam.

Having described this invention, what I claim, and desire to secure by Letters Patent, is—

The combination, with the beams B, adjustable toward or from each other, and a plow-section, D, having a shank, of side mold-boards E, each provided with an independent shank, said section D and mold-boards E adapted to be secured as described, to form a single-wing plow, or detached to form cultivator-teeth, as specified.

In testimony that I claim the above I have hereunto subscribed my name in the presence of two witnesses.

DANIEL STANCHFIELD.

Witnesses:
J. VAUPMANN,
O. R. LIPPITT.